(12) United States Patent
Gardner et al.

(10) Patent No.: US 10,794,083 B2
(45) Date of Patent: Oct. 6, 2020

(54) RETRACTABLE STRIKER COVER ASSEMBLY FOR VEHICLE

(71) Applicant: Ford Global Technologies, LLC, Dearborn, MI (US)

(72) Inventors: Cornel Lewis Gardner, Romulus, MI (US); Megan Lovejoy, Dearborn, MI (US); Inshirah Hillawi, Canton, MI (US); Stuart C. Salter, White Lake, MI (US); Steven J. Antilla, Brighton, MI (US); Patrick Berryman, Dearborn, MI (US); Scott H. Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 684 days.

(21) Appl. No.: 15/370,214

(22) Filed: Dec. 6, 2016

(65) Prior Publication Data

US 2017/0081875 A1   Mar. 23, 2017

Related U.S. Application Data

(62) Division of application No. 13/796,229, filed on Mar. 12, 2013, now Pat. No. 9,556,648.

(51) Int. Cl.
  *E05B 15/02*       (2006.01)
  *E05B 85/04*       (2014.01)
  (Continued)

(52) U.S. Cl.
  CPC .......... *E05B 15/029* (2013.01); *B60Q 1/323* (2013.01); *B60Q 3/30* (2017.02); *E05B 17/10* (2013.01);
  (Continued)

(58) Field of Classification Search
  CPC .... E05B 15/029; E05B 15/02; E05B 15/0205; E05B 15/0295; E05B 17/10;
  (Continued)

(56) References Cited

U.S. PATENT DOCUMENTS 3,751,088 A * 8/1973 Schlage ............... E05B 47/023
                                                    292/201
4,519,640 A * 5/1985 Mombelli .......... E05B 47/0012
                                                    292/33
(Continued)

FOREIGN PATENT DOCUMENTS

DE    202004004917 U1    6/2004
DE    102006044953 A1    4/2007
(Continued)

OTHER PUBLICATIONS

"DZ-Modified Light Truck Standard Backlight LED Light Truck Standard Automotive Tail Beacon Light Illuminated Logo," 24 pages, Copyright 2011-2012 Guangzhou Ding Zhong LED Auto Lamp, www.dingzhongled.com/en/DZ-logo-backlight.html.
(Continued)

*Primary Examiner* — Alyson M Merlino
(74) *Attorney, Agent, or Firm* — David Coppiellie; Price Heneveld LLP

(57) ABSTRACT

A retractable cover assembly is provided for a vehicle to cover a latching component such as the striker of a trunk door. The assembly includes a retractable cover and a support structure for supporting the cover at a position to cover the striker. The assembly further includes an arrangement for actuating the cover between an open position exposing the striker and a closed position covering the striker. A first light source may illuminate the cover and a second light source may illuminate an interior of the vehicle when the cover is in the closed position.

10 Claims, 5 Drawing Sheets

(51) Int. Cl.
  *E05B 17/10* (2006.01)
  *E05B 47/00* (2006.01)
  *B60Q 3/30* (2017.01)
  *E05F 15/73* (2015.01)
  *B60Q 1/32* (2006.01)

(52) U.S. Cl.
  CPC ........ E05B 47/0001 (2013.01); E05B 85/045 (2013.01); E05F 15/73 (2015.01); *Y10T 292/694* (2015.04)

(58) Field of Classification Search
  CPC .. E05B 17/002; E05B 17/005; E05B 17/0091; E05B 17/106; E05B 17/181; E05B 47/0001; E05B 85/045; E05B 85/04; E05B 85/00; E05B 83/00; E05B 83/16; E05B 83/18; E05F 15/73; Y10T 292/68; Y10T 292/683; Y10T 292/694; Y10T 292/696; Y10T 292/699; B60Q 15/73; B60Q 1/323; B60Q 3/30
  See application file for complete search history.

(56) References Cited

U.S. PATENT DOCUMENTS

| | | | |
|---|---|---|---|
| 5,709,453 A | 1/1998 | Krent et al. | |
| 5,880,659 A * | 3/1999 | Woods | G08B 13/08 200/61.7 |
| 5,895,115 A | 4/1999 | Parker et al. | |
| 6,318,138 B1 * | 11/2001 | Mathews | E05B 47/0012 292/144 |
| 7,195,385 B2 | 3/2007 | Zimmermann et al. | |
| 7,249,869 B2 | 7/2007 | Takahashi et al. | |
| 8,727,403 B2 | 5/2014 | Johnson et al. | |
| 2009/0051528 A1* | 2/2009 | Graichen | G07C 9/00103 340/547 |
| 2009/0289780 A1* | 11/2009 | Tenorio-Fox | B60R 25/04 340/425.5 |
| 2009/0308116 A1* | 12/2009 | Lambrou | E05B 47/02 70/277 |
| 2010/0176917 A1* | 7/2010 | Bacarella | E05B 47/026 340/5.6 |
| 2011/0121654 A1* | 5/2011 | Recker | H02J 9/065 307/66 |
| 2011/0260848 A1* | 10/2011 | Rodriguez Barros | B60Q 1/2665 340/438 |
| 2013/0031844 A1 | 2/2013 | Quinn et al. | |
| 2013/0038075 A1 | 2/2013 | Wilde et al. | |
| 2013/0257611 A1* | 10/2013 | Lamb | G08B 25/008 340/501 |
| 2013/0300564 A1* | 11/2013 | Lamb | G08B 25/008 340/573.4 |

FOREIGN PATENT DOCUMENTS

| | | | |
|---|---|---|---|
| EP | 1975958 A2 | 10/2008 | |
| FR | 2891294 A1 | 3/2007 | |
| GB | 2361310 A * | 10/2001 | ............... G01V 8/10 |
| JP | 2004044258 A | 2/2004 | |
| JP | 2005247175 A | 9/2005 | |
| JP | 2007217908 A | 8/2007 | |
| JP | 4961006 B2 | 3/2012 | |
| WO | 2004060720 A2 | 7/2004 | |
| WO | 2009075924 A1 | 6/2009 | |

OTHER PUBLICATIONS

"ORACLE Automotive Lighting Products," 2 pages, Copyright 2012, Oracle Lighting LLC, oraclelights.cim/automotive-lighting-products/ORACLE-illuminated-badges.

Ford Fusion Model Year 2013 Truck Striker Cover Photographs, 1 page.

Audio A4L Model Year 2012 Trunk Striker Cover Photographs, 1 page.

2010 Audio A4 Sedan Photographs, www.automobilemag.com, copyrighted 2013 by Automobile Magazine, 4 pages.

* cited by examiner

RETRACTABLE STRIKER COVER ASSEMBLY FOR VEHICLE

CROSS-REFERENCE TO RELATED APPLICATION

This application is a divisional of U.S. patent application Ser. No. 13/796,229 filed Mar. 12, 2013, now U.S. Pat. No. 9,556,648 entitled RETRACTABLE STRIKER COVER ASSEMBLY FOR VEHICLE." The aforementioned related application is hereby incorporated by reference.

FIELD OF THE INVENTION

The present invention generally relates to a component for a vehicle latch assembly, and more particularly relates to the cover for covering a door latching component on the vehicle.

BACKGROUND OF THE INVENTION

Automotive vehicles typically employ various latches which operatively engage a striker to close a door member relative to the vehicle body. For example, a car typically has a trunk door with a latch that engages a striker on the door sill at the rear of the vehicle body. Similarly, a hatchback vehicle has a hatchback door with a latch that engages a striker within the opening on the hatchback door sill. The striker typically is exposed when the trunk or hatchback door is in the open position.

SUMMARY OF THE INVENTION

According to one aspect of the present invention, a retractable cover assembly for a vehicle is provided. The retractable cover assembly includes a retractable cover and a support structure for supporting the cover in a position to cover a vehicle door latching component. The retractable cover assembly also includes an arrangement for actuating the cover between an open position exposing the latching component and a closed position covering the latching component. The retractable cover assembly further includes a first light source operative to illuminate the cover in the closed position.

According to another aspect of the present invention, a retractable cover assembly for a vehicle door is provided. The retractable cover assembly includes a pivoting cover and a support structure for supporting the cover in a position to cover a vehicle door latching component. The retractable cover assembly also includes an arrangement for actuating the cover between an open position exposing the latching component and a closed position completely covering the latching component.

According to a further aspect of the present invention, a retractable cover assembly for a vehicle door is provided. The retractable cover assembly includes a pivoting cover and a support structure for supporting the cover in a position to cover a striker. The retractable cover assembly also includes an arrangement for pivoting the cover between an open position exposing the striker and a closed position completely covering the striker and a light source operatively coupled to the cover to illuminate the cover in the closed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
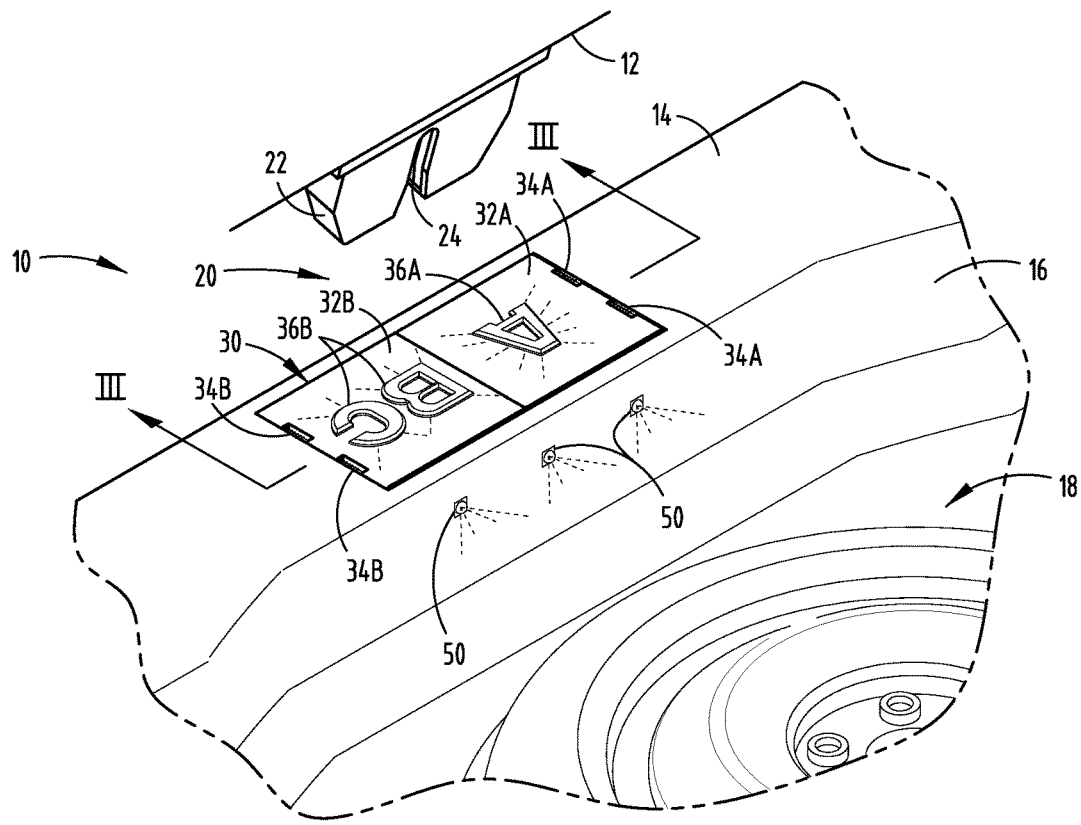
FIG. 1 is a perspective view of a vehicle trunk having a retractable striker cover assembly with the cover closed to cover the striker, according to one embodiment.
Figure 2:
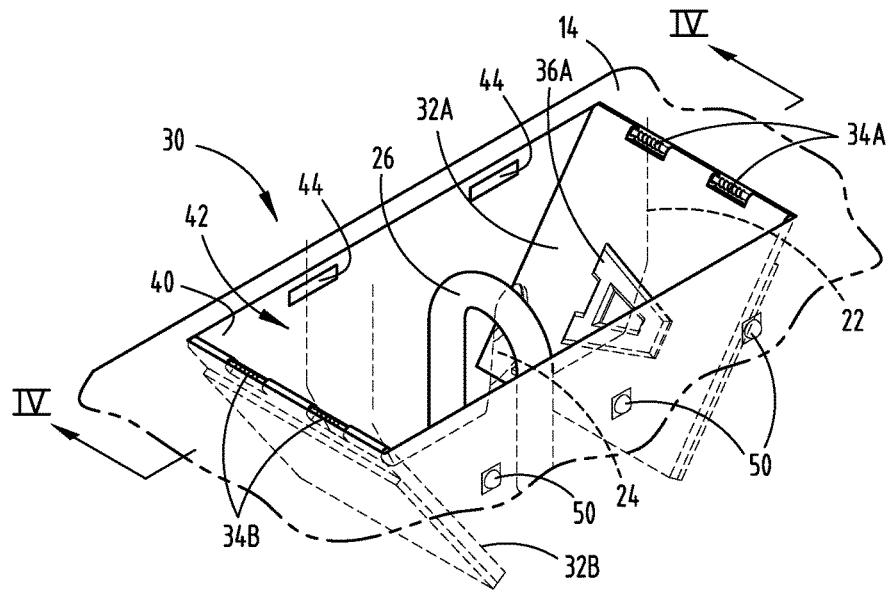
FIG. 2 is an enlarged perspective view of the retractable striker cover assembly showing the cover in the open position exposing the striker.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, an automotive vehicle 10 is generally illustrated having a trunk storage compartment 18 generally provided in the body portion at the rear side of the vehicle. The vehicle 10 includes a trunk door 12 which is generally hingedly connected to the vehicle body typically on a trunk door sill 14 as is generally known in the art. The trunk door 12 has a latch assembly 20 to latch and hold closed the trunk door 12 to the vehicle body. The latch assembly 20 generally includes a latch housing 22 and a latch 24 shown disposed within the housing 22 and assembled to the latch door 12. The latch assembly 20 includes a striker 26 located on the trunk door sill 14 of the vehicle body. The latch 24 and striker 26 are latching components that serve as a door catch to lock the door in the closed position. The latch assembly 20 operates by the latch 24 lockingly engaging the striker 26 to lock the door 12 closed against the trunk door sill 14. The latch 24 is releasable to an unlocked position to release engagement with the striker 26 to allow the trunk door 12 to release and open, thereby allowing access to the trunk storage compartment 18.

The vehicle 10 includes a retractable cover assembly 30 positioned on the trunk door sill 14 to completely cover one of the latching components, that is the striker 26 or latch 24, when the door 12 is open and actuatable to an open position to expose the one of the striker 26 and latch 24 for engagement with the other of the striker 26 and latch mechanism 24 when the trunk door 12 closes. In the embodiment shown, the cover assembly 30 completely covers the striker 26 such that the striker 26 is not visible. Thus, the complete covering of the striker 26 provides an aesthetically pleasing appearance and prevents dirt and other objects from contacting the striker 26. It should be appreciated that the cover assembly 30 may completely cover the latch 24 according to other embodiments. The retractable cover assembly 30 includes a retractable cover shown made up of first and second pivoting drop-door covers 32A and 32B, according to one embodiment. The cover assembly 30 also includes a support structure for supporting the covers 32A and 32B in a position to cover one of the vehicle door latch and striker. The support structure is shown including walls 40 formed within door sill 14 which generally define a striker recess or space 42. The striker 26 is assembled within recess 42 such that the covers 32A and 32B may extend over the top of the recess 42 and striker 26 to cover the striker 26 when the door 12 is open.

Hinge assembles 34A and 34B are shown connected to the covers 32A and 32B, respectively, to allow the covers 32A and 32B to pivot between the closed position and the open position. In the embodiment shown, two hinges 34A are connected along one side of first cover 32A, and two hinges 34B connect the opposite side of the second cover 32B such that covers 32A and 32B open from a substantially planar arrangement to drop-down in the middle to a substantially perpendicular arrangement and expose the striker 26 therebetween. Hinges 34A and 34B each include a bias spring 46A or 46B that biases the covers 32A and 32B to the closed position as shown in FIGS. 1 and 3.

Figure 3:
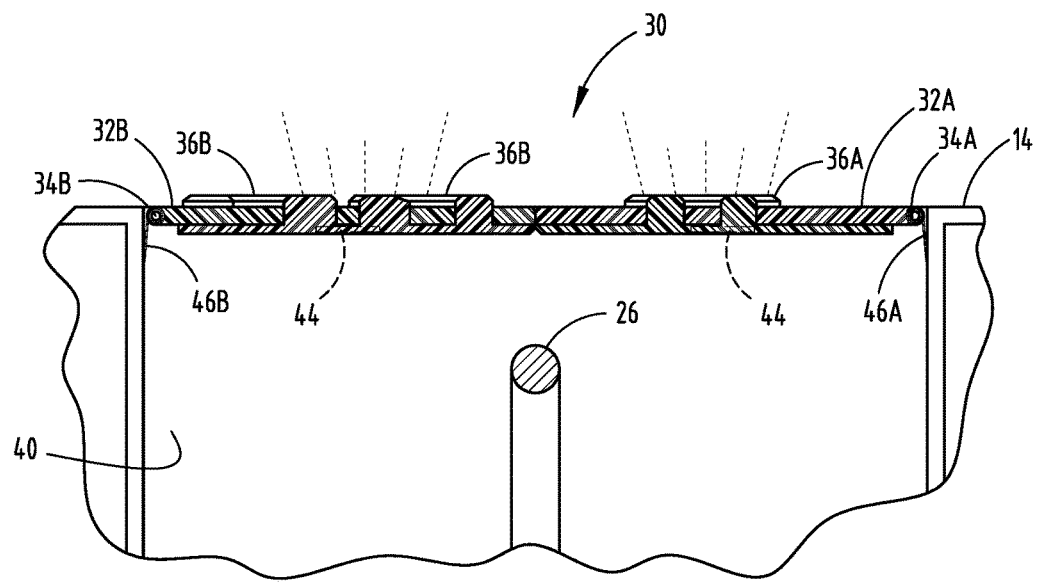
FIG. 3 is a cross-sectional view of the striker cover assembly taken through line of FIG. 1.
Figure 4:
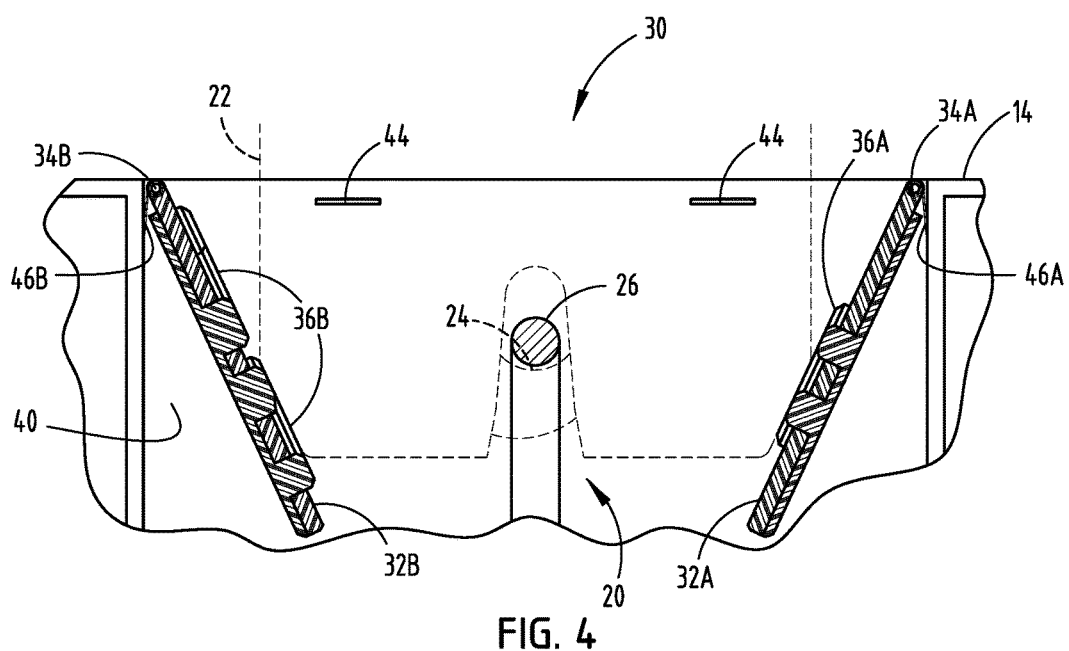
FIG. 4 is a cross-sectional view of the striker cover assembly shown with the cover in the open position and the latch mechanism engaging the striker.

In the embodiment shown in FIGS. 1-4, the retractable cover assembly 30 is actuated to the open position due to contact force applied by the latch housing 22 when the trunk door 12 is moved downward to the closed position. In doing so, housing 22 contacts the top surface of covers 32A and 32B and forces the covers 32A and 32B to pivot downward from the closed position shown in FIG. 1 to the open position shown in FIG. 2, so as to expose the striker 26 and allow connection of the latch 24 to engage the striker 26. In doing so, bias springs 46A and 46B are compressed when the covers 32A and 32B are in the open position. When the latch 24 is disengaged or unlocked from striker 26, the trunk door 12 may move upward and away from covers 32A and 32B such that compressed bias springs 46A and 46B force the covers 32A and 32B back to the closed position as shown in FIGS. 1 and 3 in which the striker 26 is completely covered.

The retractable cover assembly 30 includes one or more first light sources 44 located within the striker recess 42 to illuminate the covers 32A and 32B with lighting. The first light sources 44 may include one or more LEDs or other light sources. The covers 32A and 32B include light illumination portions 36A and 36B which emit light generated by the first light source(s) 44. The illumination portions 36A and 36B may include print, such as a logo, text or other indicia that is lit via backlighting or edge lighting to provide a lighted striker cover. In the embodiment shown, the first light sources 44 are arranged in side wall 42 and aligned with an edge of the covers 32A and 32B to provide edge lighting to the covers 32A and 32B when the covers 32A and 32B are in the closed position. Covers 32A and 32B include a luminescent material that transmits light through the covers 32A and 32B in this embodiment. In doing so, portions of the covers 32A and 32B other than the light emitting portions 36A and 36B may include an opaque coating or other light barrier to prevent light transmission to be emitted therethrough. As such, light received by the first light sources 44 passes through the covers 32A and 32B and is emitted from the top surface of light emitting portions 36A and 36B so as to illuminate the covers 32A and 32B. In one embodiment, the light emitting portions 36A and 36B may include a molded clear plastic snap fit or heat stacked to the bottom side of an opaque material. The first light sources 44 are activated or illuminated when the trunk door 12 is in the open position and are deactivated when the trunk door 12 is in the closed position.

The retractable cover assembly 30 further includes one or more second light sources 50, shown installed forward of the covers 32A and 32B in wall 16 and directed to illuminate at least a portion of the interior of the trunk storage compartment 18 of the vehicle 10. The second light sources 50 may include one or more LEDs or other light sources. In the embodiment shown, three LEDs 50 are shown providing light illumination into the trunk storage compartment 18 to aid the user of the vehicle with lighting when the trunk door 12 is in the open position. The second light sources 50 are activated or illuminated when the trunk door 12 is in the open position, and are deactivated when the trunk door 12 is in the closed position.

The retractable cover assembly 30 may be configured with the one or more first light sources 44 edge lighting the covers 32A and 32B to illuminate the covers 32A and 32B and to also illuminate at least a portion of the interior of the trunk storage compartment 18 of the vehicle 10, according to a further embodiment. In this embodiment, the first edge lit light sources 44 provide the function of illuminating the trunk storage compartment such that the second light sources are not needed. In doing so, the covers 32A and 32B receive light from the first light sources 44 and act as a light pipe to transfer the light from the rear edge to the opposite front edge. An opening may be provided in the front side of the trunk door sill 14 to allow the light exiting the front edge of the covers 32A and 32B to be emitted into the trunk storage compartment 18. The opening in the sill 14 may have a clear lens inserted therein or a lens molded therein, such that light illuminating from the front edge of the covers 32A and 32B passes through the lens and illuminates the trunk storage compartment 18. The embodiment employing the first light sources 44 to illuminate the trunk storage compartment 18 without the need for the second light sources 50 may be employed on any of the embodiments disclosed herein.

Figure 5:
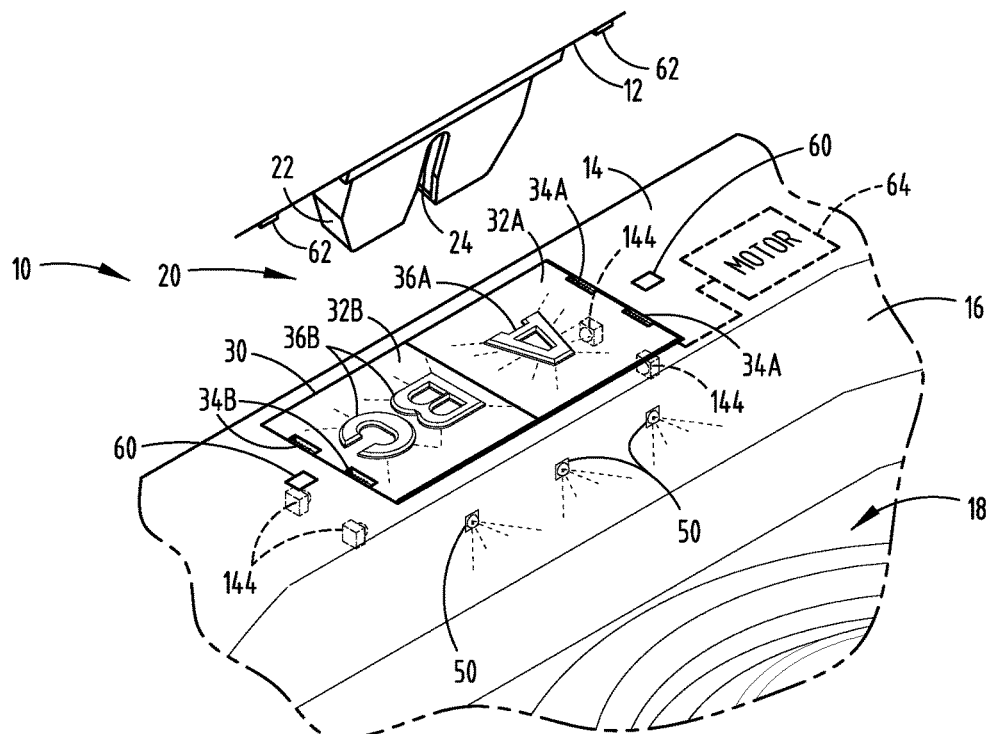
FIG. 5 is a perspective view of a vehicle trunk having a retractable striker cover assembly employing sensors and a motor for actuating the cover, according to another embodiment.

Referring to FIG. 5, a vehicle 10 is shown having a retractable cover assembly 30 employing trunk door detection sensors 60 and 62 and an alternative arrangement of the latch recess mounted first light sources 144. In this embodiment, a pair of sensors 60 are shown located on the trunk door sill 14 and arranged to sense corresponding one or more signals with sensors 62 located on the trunk door 12. As the trunk door 12 approaches the trunk door sill 14, sensors 60 and 62 detect close proximity to one another and actuate a motor or other mechanism to actuate the covers 32A to the open position and 32B to thereby expose the striker 26 and allow the latch mechanism 24 to latch onto striker 26. The sensors 60 and 62 may include infrared (IR) sensors, magnetic sensors, capacitive sensors, and other proximity sensors for detecting closure of the trunk door 12. The mechanism for actuating the covers 32A and 32B between the open and closed position may include an electric motor, according to one embodiment, or an electromagnet assembly, according to another embodiment. It should be appreciated that while two pairs of sensors each having sensors 60 provided on the body sill 14 and sensors 62 provided on the trunk door 12 are shown, it should be appreciated that one or more sensing elements may be employed to sense closure of the trunk door 12.

The first light sources 144 are shown in FIG. 5 located below the covers 32A and 32B within the striker recess 42. The first light sources 144 may include one or more LEDs or other light sources for providing light illumination within the striker recess 42. As such, the first light sources 144 illuminate the entire recess 42 such that light is allowed to be emitted from the light emitting portions 36A and 36B by transmitting through portions 36A and 36B when the covers 32A and 32B are in the closed position. The light emitting portions 36A and 36B are light transmissive areas surrounded by an opaque material. When the trunk door 12 is closed and the covers 32A and 32B are opened, the first light sources 144 are deactivated.

Figure 6:
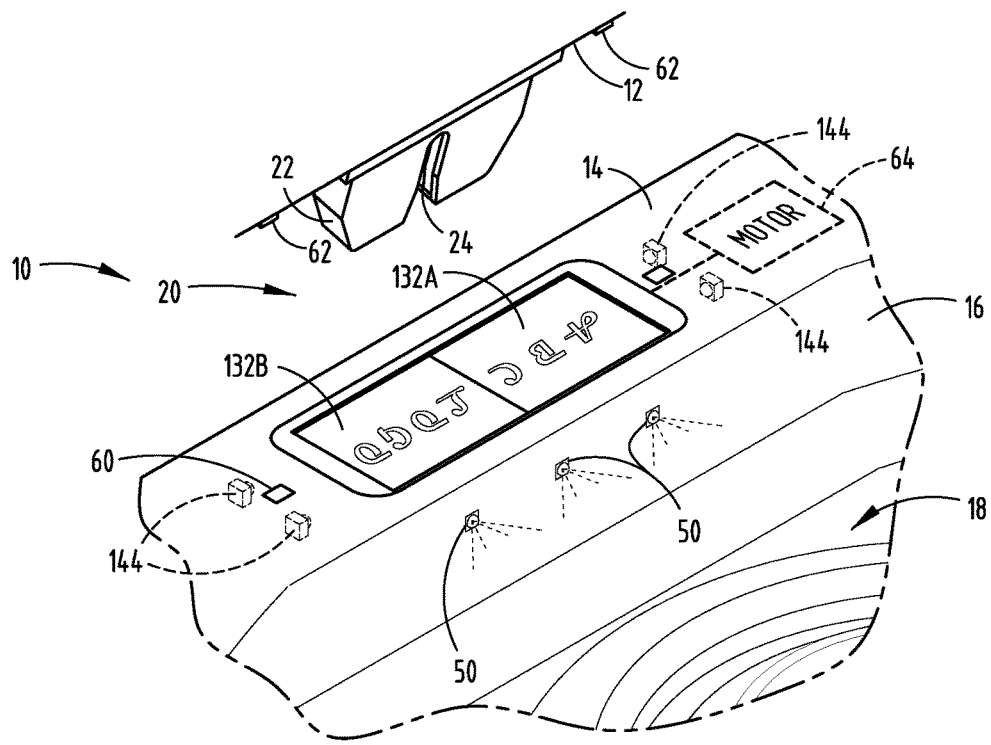
FIG. 6 is a perspective view of a vehicle trunk having a sliding striker cover assembly actuatable by a motor in response to a sensor, according to yet another embodiment.

Referring to FIG. 6, a vehicle 10 employing a retractable cover assembly 30 with first and second sliding covers 132A and 132B is illustrated, according to another embodiment. In this embodiment, the covers 132A and 132B are located within a track that allows each of the covers 132A and 132B to slide in the same plane toward each other into the closed position and away from each other into the open position. The track may include a pair of rails each defining a slot on opposite sides in which the covers 132A and 132B may slide. In the open position, covers 132A and 132B are moved apart such that they slide under a portion of the trunk door sill 14 to expose the striker 26. The cover assembly 30 may include one or more sensors 60 and 62 and an actuator, such as a motor 64, to sense closure of the trunk door 12 and automatically open and close the covers 132A and 132B. Additionally, the first light source 144 may include one or more edge lit light sources, according to one embodiment, or may include lighting from light source(s) below the covers 132A and 132B.

Figure 7:
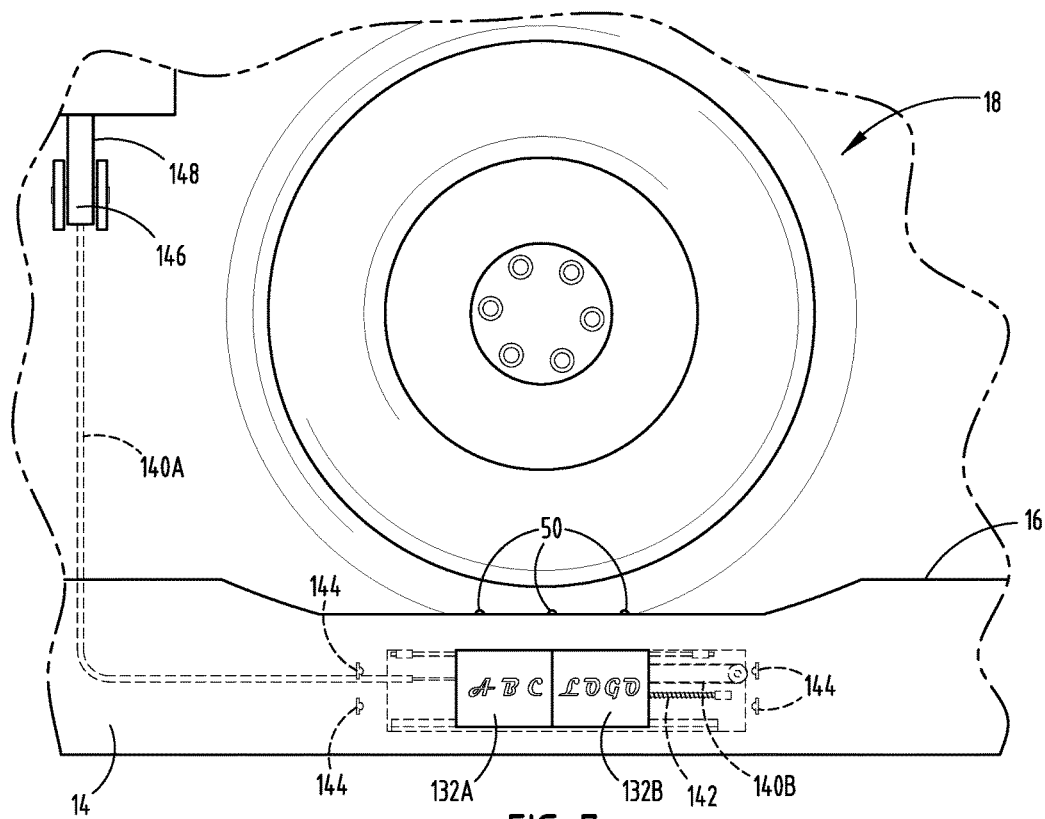
FIG. 7 is a top view of the vehicle trunk area having a striker cover assembly with a sliding striker cover actuatable by a cable responsive to movement of the trunk hinge, according to a further embodiment.
Figure 8:
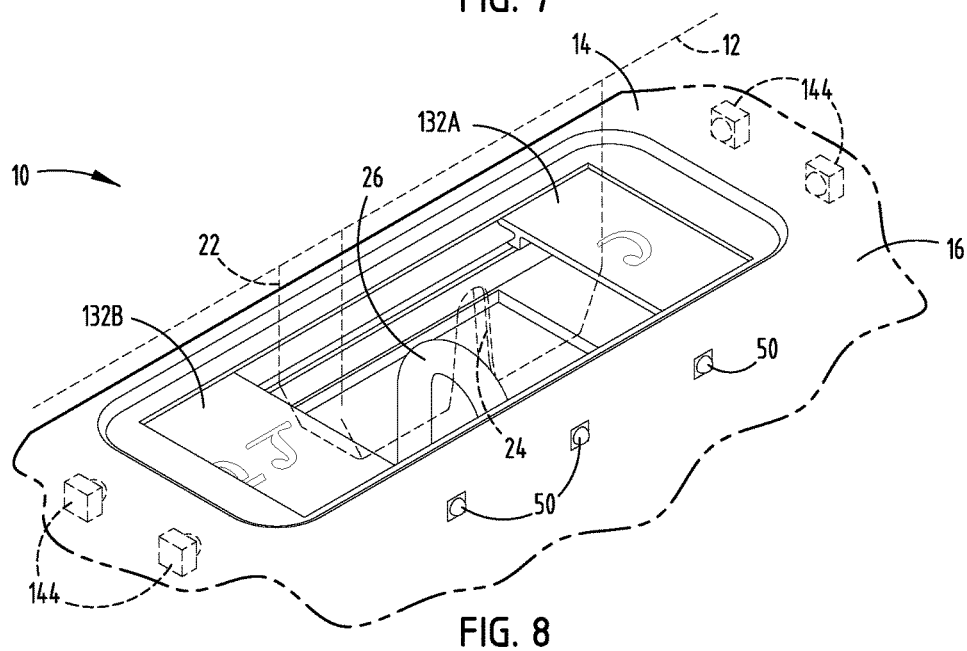
FIG. 8 is an enlarged perspective view of the striker cover assembly employing the sliding cover.
Figure 9:
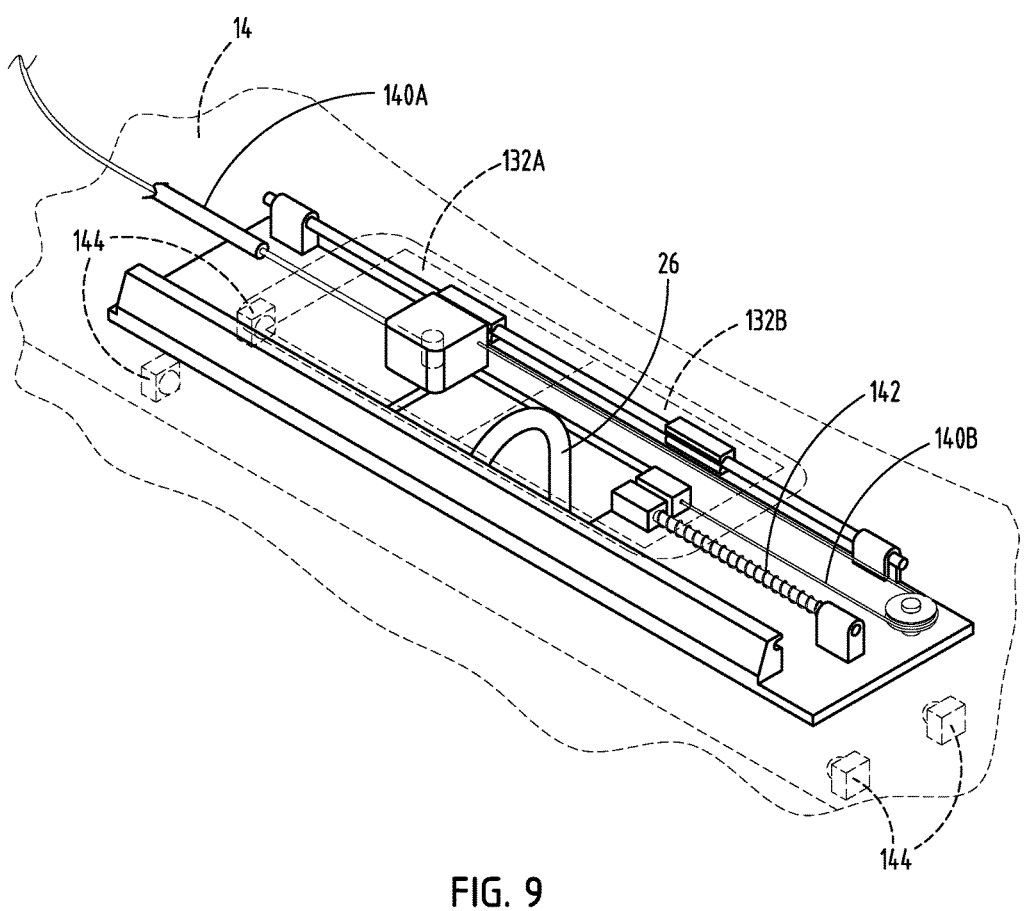
FIG. 9 is a perspective view of the striker cover assembly with the cover removed and showing the cable actuation assembly.

Referring to FIGS. 7-9, the retractable cover assembly 30 employing first and second sliding covers 132A and 132B is illustrated having a cable assembly operable to actuate the covers 132A and 132B between the closed and open positions. The cable assembly includes a first cable 140A shown connected to the first cover 132A and the door trunk hinge 146, and a second cable 140B connected to the second cover 132B. Trunk hinge 146 is connected to a bracket 148 which connects to the trunk door. A spring biased connection 142 is connected directly to the second cover 132B. When the vehicle trunk door 12 is closed, the hinge 142 which is operatively coupled thereto rotates so as to pull cable 140A and first cover 132A away from second cover 132B so as to open the covers 132A and 132B and expose the striker 26 for connection to the latch mechanism as shown in FIG. 8. Spring 142 biases the covers 132A and 132B to the closed position such that when the trunk door 12 is opened, the covers 132A and 132B move to the closed position as shown in FIG. 7.

The retractable cover assembly 30 is shown and described herein in connection with first and second covers that may pivot and drop down to an open position or may slide within a plane to an open position. However, it should be appreciated that the retractable cover assembly 30 may employ a single cover member that moves relative to the striker 26 between a closed position that completely covers the striker 26 and an open position that exposes the striker 26. For example, a single cover may slide between open and closed positions, according to one embodiment. According to another embodiment, a single cover may pivot between open and closed positions. It should further be appreciated that more than two cover members may be provided according to further embodiments.

The retractable cover assembly 30 may be configured with a retractable cover in the form of a tambour door or cover, according to a further embodiment. In this embodiment, the tambour cover may be flexible such that it bends and may be positioned within a curved track such that the cover slides between an open position exposing the striker and a closed position completely covering the striker. The tambour cover may slide to one side of the striker or may be configured with multiple tambour covers, such as two tambour covers that slide away and toward one another to expose the striker and cover the striker.

Accordingly, the retractable cover assembly 30 advantageously covers a latch component such as the striker 26 when the trunk door 12 is in the open position, which prevents objects from contacting the striker 26 and provides for an aesthetically pleasing appearance of the vehicle sill 14. Additionally, the covers serve as a light source to illuminate the trunk area of the vehicle and provides a lighted cover assembly and illuminated logo or other illuminated indicia.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A retractable cover assembly for a vehicle door, comprising:
    a retractable cover comprises a plurality of moving doors, wherein the plurality of moving doors comprises first and second sliding doors that slide within a common plane between open and closed positions, each of the first and second sliding doors having a side edge extending perpendicularly between top and bottom surfaces, thereof;
    a support structure supporting the first and second sliding doors in the closed position so as to cover a vehicle door latching component;
    a sensor arrangement sensing a position of the vehicle door, the sensor arrangement comprising one or more sensing elements located on at least one of a vehicle door sill and the vehicle door to sense the position of the vehicle door;
    an actuator for actuating the first and second sliding doors between the open and closed positions based on the sensed position of the vehicle door; and
    a light source operative to illuminate the first and second sliding doors in the closed position, wherein the light source is operative to directly illuminate the side edge of each of the first and second sliding doors in the closed position to edge light the cover.

2. The assembly of claim 1, wherein the latching component comprises a striker.

3. The assembly of claim 1, wherein the vehicle door comprises a trunk door.

4. The assembly of claim 1, wherein the actuator comprises a motor.

5. A retractable cover assembly for a vehicle door, comprising:
    a sliding cover having a top surface, a bottom surface, and a side edge extending perpendicularly to the top and bottom surfaces;
    a support structure for supporting the cover in a closed position to cover a vehicle door latching component;
    a sensor arrangement sensing a position of the vehicle door, the sensor arrangement comprising one or more sensing elements located on at least one of a vehicle door sill and the vehicle door to sense the position of the vehicle door;
    a light source operative to illuminate the cover when the cover is in the closed position, wherein the light source is operative to directly illuminate the side edge of the cover; and
    an actuator for actuating the cover between an open position, exposing the latching component, and the closed position, covering the latching component.

6. The assembly of claim 5, wherein the actuator actuates the cover between the open and closed positions based on the sensed position of the vehicle door.

7. The assembly of claim 5, wherein the vehicle door comprises a trunk door.

8. The assembly of claim 5, wherein the actuator comprises a motor.

9. A retractable cover assembly for a vehicle door, comprising:
    a plurality of moving doors supported in a closed position to cover a striker, wherein the plurality of moving doors comprises first and second sliding doors that slide within a common plane between an open position and the closed position, each of the first and second sliding doors having a side edge extending perpendicularly to top and bottom surfaces, thereof;
    a sensor arrangement sensing a position of the vehicle door, the sensor arrangement comprising one or more sensing elements located on at least one of a vehicle door sill and the vehicle door to sense the position of the vehicle door;
    an actuator for actuating the first and second sliding doors, based on the sensed position of the vehicle door, between the open position, exposing the striker, and the closed position, covering the striker; and
    a light source operative to directly illuminate the side edge of each of the first and second sliding doors to edge light the first and second sliding doors in the closed position.

10. The assembly of claim 9, wherein the actuator comprises a motor.

* * * * *